United States Patent [19]

Zieher

[11] Patent Number: 5,175,541
[45] Date of Patent: Dec. 29, 1992

[54] EVALUATING CIRCUIT FOR INDUCTIVE DISPLACEMENT PICKUP

[75] Inventor: Peter Zieher, Eberdingen, Fed. Rep. of Germany

[73] Assignee: Robert Bosch GmbH, Stuttgart, Fed. Rep. of Germany

[21] Appl. No.: 682,579

[22] Filed: Apr. 8, 1991

[30] Foreign Application Priority Data

Jun. 2, 1990 [DE] Fed. Rep. of Germany ....... 4017846

[51] Int. Cl.$^5$ ............................................. G08C 19/06
[52] U.S. Cl. ......................... 340/870.35; 340/870.36; 324/207.18
[58] Field of Search ...................... 340/870.35, 870.36, 340/870.32; 324/207.17, 207.18, 207.19, 140 R

[56] References Cited

U.S. PATENT DOCUMENTS 4,857,919 8/1989 Braswell ........................ 340/870.36

FOREIGN PATENT DOCUMENTS

89/11105 11/1989 World Int. Prop. O. .

OTHER PUBLICATIONS

Hurthig Vurlag GmbH; Professionelle Integriette Analog-und Spetialschaltungen Teil 2; 1988; 814-831; Valvo.

Primary Examiner—Donald J. Yusko
Assistant Examiner—Michael Horabik
Attorney, Agent, or Firm—Michael J. Striker

[57] ABSTRACT

An evaluating circuit for an inductive pickup has a rectangular signal generator for outputing a rectangular signal, a driver stage for supplying a displaement pickup with an input signal produced from the rectangular signal, a phase-coupled rectifier operative for rectifying an output signal of the displacement pickup with consideration of a phase of the rectangular signal, a sweeping/holding circuit for sweeping the rectified output signal in established sweeping time intervals, and a pulse supplying circuit which at predetermined time points produced on flanks of the rectangular signal control pulses for establishing the sweeping time intervals. The predetermined time points are selected so that during the sweeping time intervals established by the time points the output signal after introducing of rectangular pulse in the displacement pickup is substantially naturally oscillated.

3 Claims, 2 Drawing Sheets

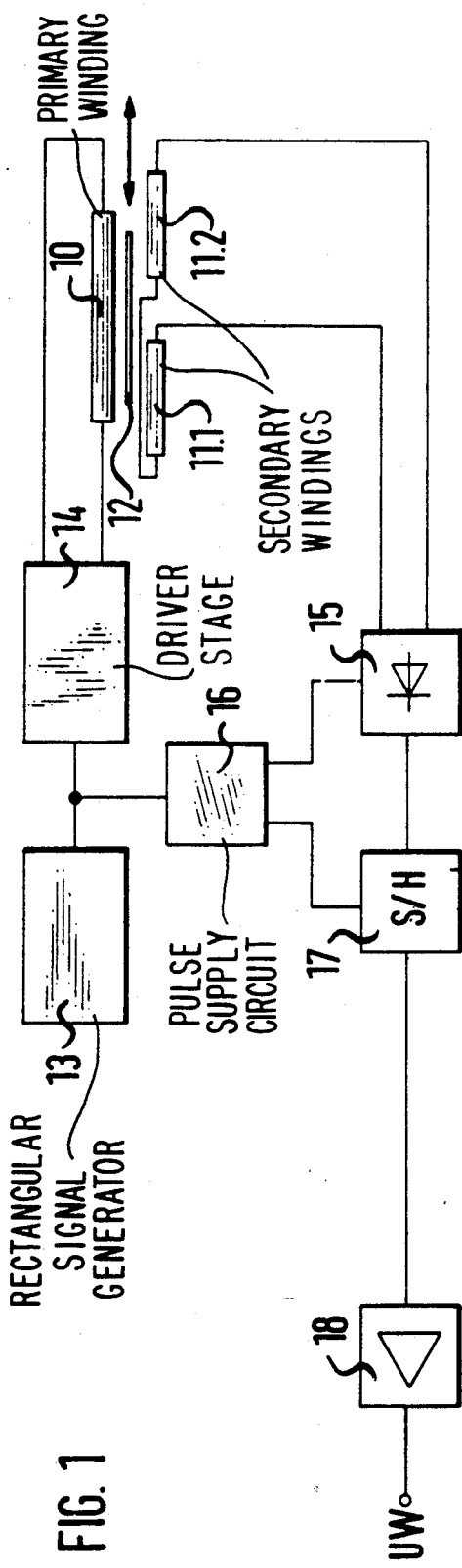
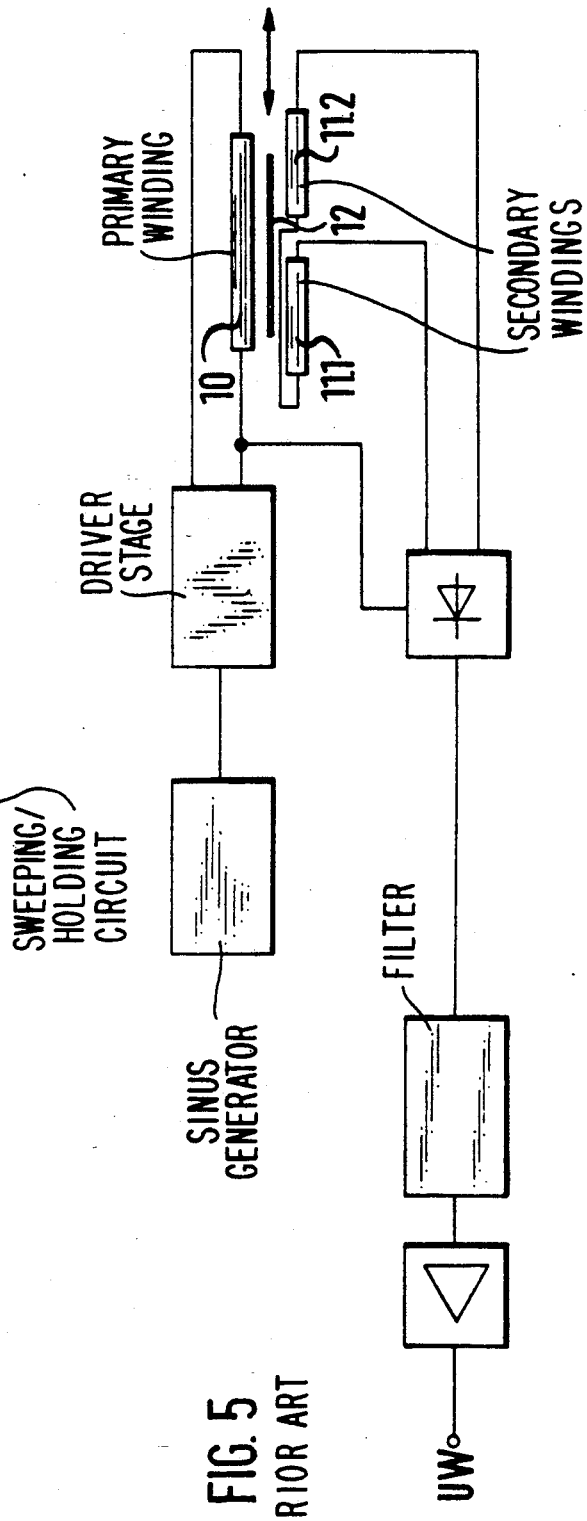

EVALUATING CIRCUIT FOR INDUCTIVE DISPLACEMENT PICKUP

BACKGROUND OF THE INVENTION

The present invention relates generally to an evaluating circuit for an inductive displacement pickup. Such evaluating circuits are used for example for evaluation of signals supplied from a differential transformer with a displaceable core and for outputting displacement pickup signals.

An evaluating circuit of the above mentioned type for any inductive displacement pickup is described for example in Valvo-Datenbuch, Professionelle Integrierte Analog- und Spezialschaltungen, Part 2, Dr. Alfred Hüthig Verlag GmbH, Heidelberg, pages 818 and 819 under the title "Using the NE5521 Signal Conditioner in Mutli-Faceted Application". The above described circuit is briefly represented there by FIG. 5. It is described there with an application as a differential trafo displacement transmitter. Respective other applications with inductive displacement pickups are also correspondingly possible, as contained in the above mentioned article. The same is true for the present invention. In order to be brief however only those examples which are used as differential trafo displacement pickups are described.

The known circuit shown in FIG. 5 has a sinus generator which is controlled by a driver for supplying a primary winding 10 of a differential trafo displacement pickup. At the secondary side two secondary windings 11.1 and 11.2 are provided, and their output voltages change oppositely when a displaceable core 12 is displaced. The driver circuit operates for doubled voltage stroke. The secondary-side difference signal is rectified by a phase-coupled rectifier with consideration of the phase of the driver signal. This rectified signal has a relatively high waviness ( standing wave ratio) and therefore it must be positively filtered so as to finally form a useable displacement pickup-direct voltage UW after reinforcing of the filtered voltage.

For providing an output signal which is as smooth as possible, other evaluating circuits are also known. In a circuit described in the European Patent document EP 88 903 834, a balancing process (inductive variation) is performed by means of a balancing direct voltage. The balancing value of this direct voltage is directly proportional to the displacement detected by the displacement pickup. It is obvious that this voltage can be obtained without any waviness. However, the circuitry expenses are considerable.

SUMMARY OF THE INVENTION

Accordingly, it is an object of the present invention to provide an evaluating circuit for an inductive displacement pickup, in which an output signal has as little waviness as possible.

In keeping with these objects and with others which will become apparent hereinafter, an evaluating circuit for an inductive displacement pickup in accordance with the present invention has the following elements:
- a rectangular signal generator for outputting a rectangular signal,
- a driver stage for supplying the displacement pickup with an input signal produced from the rectangular signal,
- a phase-coupled rectifier which rectifies the output signal of the displacement pickup with consideration of the phase of the rectangular signal,
- a sweep (scanning) holding circuit for sweeping the rectified output signal in fixed sweeping time intervals,
- a pulse supplying circuit which at predetermined time points outputs on the flanks of the rectangular signal a control pulse for establishing the sweeping time intervals, wherein the predetermined time points are arranged so that during the sweeping time intervals established by them the output signal after introducing of a rectangular pulse in the displacement pickup is substantially naturally oscillated.

The evaluating circuit in accordance with the present invention decisively distinguishes from the above mentioned known evaluating circuits in that it operates with rectangular signals instead of sinus signals. When a rectangular pulse is supplied to the displacement transmitter at the input side, a rectangular pulse is also produced at the output side which however must be naturally oscillated. The output-side rectangular circuit is swept inside such a time interval, in which it is accepted that in it a naturally oscillated condition is available. The swept signal is retained. During this sweeping and holding, a very low residual waviness is obtained which is however so small that it is either negligible or can be eliminated by simplest filtering steps. Due to the use of rectangular signals instead of sinus signals and due to sweeping and holding, the expensive filtering arrangements required before are eliminated. The evaluating circuit provides a displacement pickup signal of very low waviness in a simplest construction.

In accordance with an advantageous modification of the inventive evaluating circuit the idea is used that both for phase-coupled rectification and for sweeping, switching steps are required. Preferably a rectifier is utilized which is formed so that it does not continuously change over the voltage directions but it interposes switching conditions open for the change over steps, during which the output signal is held. Only at the time points in which actually the voltage is retransmitted (repeated) with proper sign, a sweeping takes place. The rectifying circuit takes over by the sent time cycle of the switching sequence not only the rectifier function but also the sweeping function of a sweeping/holding device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a block diagram of an evaluating circuit for an inductive displacement pickup with an input-side rectangular signal and a displacement pickup signal produced by sweeping and holding;

FIG. 5 is a block diagram corresponding to FIG. 1, but for the above described circuit with an input-side sinus signal.

DESCRIPTION OF THE PREFERRED EMBODIMENTS

Figure 2:
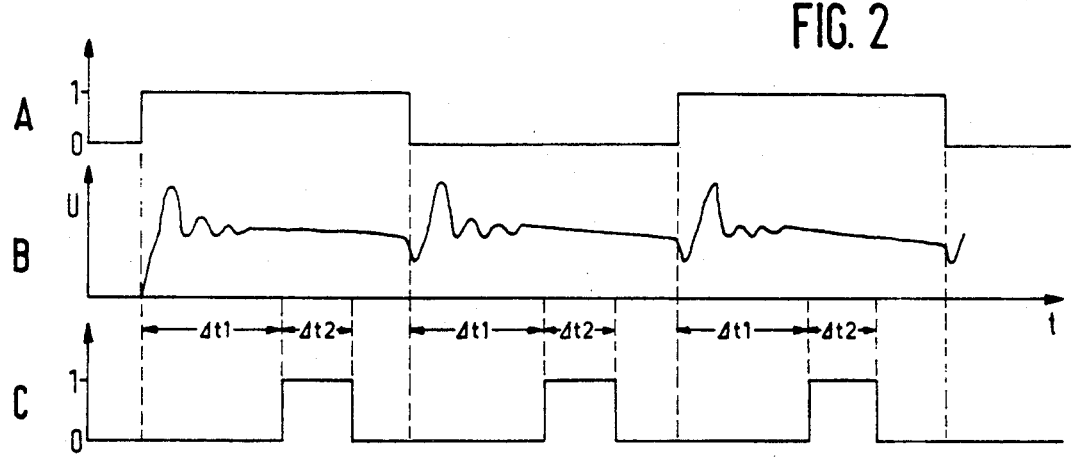
FIGS. 2A, 2B and 2C are time correlated diagrams pertaining to the input-side rectangular signal in the circuit of FIG. 1, a rectified output signal or a sweeping signal.

The evaluating circuit in accordance with FIG. 1 is shown as used for a differential trafo displacement pickup in correspondence with the above mentioned known circuit. At a primary side there is however a difference that, as a signal generator a rectangular signal generator 13 is used instead of a usual signal generator. A driver stage 14 is connected with a rectangular signal generator 13 and formed as the driver stage for controlling the primary winding 10, as disclosed in the above mentioned cited article. The difference voltage of the secondary windings 11.1 and 11.2 is supplied to a phase-coupled rectifier 15. The rectifier 15 however does not contain control pulses from the driver stage as in the known circuit, but instead from a pulse supply circuit 16 forms the control pulse dependent on the rectangular signal outputted from the rectangular generator 13. The pulse supplying circuit 16 outputs the control pulses also on a sweeping/holding circuit 17 which is connected to the phase-coupled rectifier 15. The swept and held signal is finally amplified in an amplifier 18 and outputted as a displacement pickup voltage UW which is proportional to the displacement path of the core 12 of the displacement pickup.

The operation of the circuit in accordance with FIG. 1 will be illustrated with consideration of the time-correlated diagram of FIG. 2.

The rectangular signal outputted from the rectangular signal generator 13 is shown in FIG. 2A. It moves between two levels identified as 0 and 1. The driver stage 14 serves for doubling of the signal amplitude and for symmetrizing to mass potential which however is not important for further operations. Due to the primary-side rectangular signal, secondary-side rectangular signals are produced as well, however, with pronounced natural oscillations. When however the pulse period of the input-side rectangular signal is sufficiently measured, time intervals exist in the secondary-side signals within which the output signal assumes substantially a naturally oscillated end level. Such a voltage course with oscillating processes and a time period with substantially constant end level is shown in FIG. 2B, in particular for already rectified secondary-side signal as represented by phase-coupled rectifier 15. When in secondary-side rectified signal a time interval with substantially constant potential starts, it can be determined experimentally. Such a time point lies around a predetermined time interval $\Delta t1$ after the flank of a rectangular signal. Not earlier than this time point, the pulse supplying circuit 16 switches the sweeping signal in accordance with FIG. 2C at the sweeping/holding circuit 17 to a higher level. This leads to the fact that this signal outputted from the phase-coupled rectifier 15 is swept over a time interval $\Delta t2$ which continues to a fall of the sweeping signal to a lower level. This switching over to the lower level is performed latest with the occurrence of a new flank of the rectangular signal in accordance with FIG. 2A. After this the signal value is maintained. The swept and held signal is, as mentioned above, representative after amplification as a displacement pickup voltage UW.

In order to determine very fast displacement changes with high resolution, it is advantageous to select the rectangular signal frequency as high as possible. On the other hand it must be guaranteed that a sweeping time interval $\Delta t2$ is available with sufficient constant potential and sufficient length. The favorable optimization is to be determined by experiments. This optimization is however relatively not critical. It should be mentioned that the pulse supply circuit 16 is formed advantageously by a pulse divider circuit.

Figure 3:
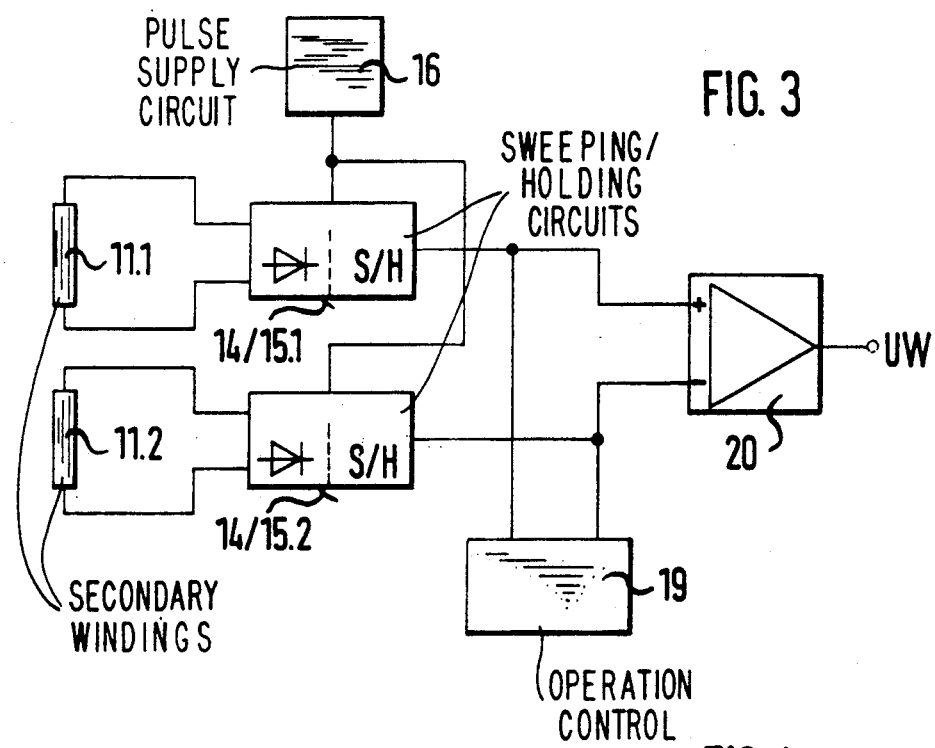
FIG. 3 is a block diagram at the output-side of an evaluating circuit in which the signals of two secondary coils of a differential trafo displacement pickup are specially processed.

FIG. 3 shows in form of a block diagram a preferable embodiment for the secondary side of an evaluating circuit at an inductive displacement pickup with two secondary windings, for example for a differential trafo or differential throttle displacement pickup. The signals are supplied separately from both secondary windings 11.1 and 11.2 and further processed by a combined rectifier-sweeping/holding circuit 14/15.1 or 14/15.2. With the aid of the swept signals an operation control 19 performs an operation testing. Here the feature is used that the rectified secondary voltage must change its value always in opposite direction to another secondary-side voltage. The operation control 19 is formed in this example via a value table in which for a plurality of values of one secondary voltage, a value region of plausible values for the other secondary voltage are stored. If a respective value of the second secondary voltage is not read in a value region based on the actual values of the first secondary voltage from the table, an error signal is outputted. With the aid of both secondary-side voltages, also the displacement pickup voltage UW is formed in a different amplifier. Since the difference voltage is no more formed in a conventional manner inside the displacement pickup, but instead is formed first at the end of the evaluating circuit the so-called operational control is possible. It was before possible only when two displacement pickups were used for measuring the same values and tested whether the signals from both displacement pickups were plausible with one another.

Figure 4:
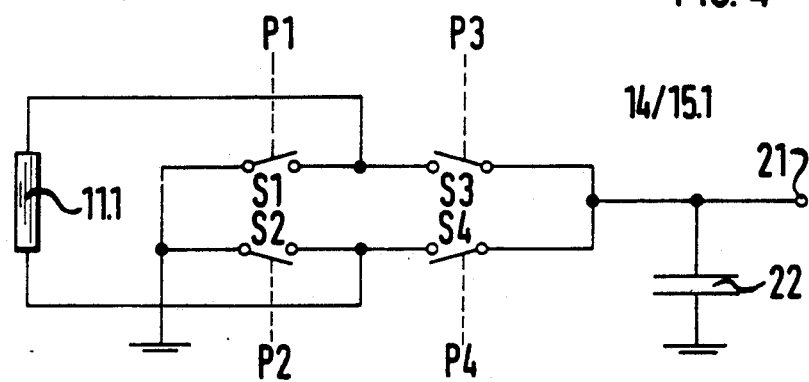
FIG. 4 is a block diagram of a phase-coupled rectifier with sweeping function.

FIG. 4 shows an example for a combined rectifier-sweeping/holding circuit 14/15.1. It includes four switches S1-S4, which are controlled through four control pulses P1-P4, and each control pulse controls a respective one of the switches. The switches are connected with the secondary winding 11.1 and the output 21 of the rectifier-sweeping/holding circuit. The connection is performed so that when the switches S2 and S3 are closed the lower connection of the secondary winding 11.1 in FIG. 4 is connected with the mass and the potential is supplied from the upper terminal to the outout 21, while when the switches S1 and S4 are closed the upper terminal of the secondary winding 11.1 is connected with the mass and the potential from the lower terminal is supplied to the output 21.

The output is connected through a capacitor 22 to the mass whereby a predetermined voltage is maintained on it. The pair-like switching over the above mentioned switches is performed depending on the phase of the rectangular signal produced outputted from the angular signal generator 13 in FIG. 1. The switches are however not actuated by each flank of the rectangular signal, but instead only at time points illustrated in FIG. 2, which establish respective sweeping time intervals. The signals P1-P4 for controlling of the switches S1-S4 are control signals outputted from the pulse supplying circuit 16.

It should be mentioned that the above described circuit, as conventional circuits, can be used with many displacement pickups. In particular, the above described circuit can be used with all displacement pickups, with which the above mentioned circuits operating with sinus signals cooperate.

Since in the above described circuits an oscillated direct signal is swept and held at the output side, the displacement pickup voltage UW is produced with a very low waviness. The output signal can be used as a rule without further smoothing; therefore no filter is shown in the drawings. When in emergency cases it is required to avoid any residual waviness, simplest smoothing features are sufficient, such as for example a filter of the first order.

It will be understood that each of the elements described above, or two or more together, may also find a useful application in other types of constructions differing from the types described above.

While the invention has been illustrated and described as embodied in an evaluating circuit for an inductive displacement pickup, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An evaluating circuit for an inductive pickup with primary and secondary windings, comprising a rectangular signal generator outputting a rectangular signal; a driver stage for supplying the primary winding of a displacement pickup with an input signal produced from the rectangular signal; a phase-coupled rectifier operative for rectifying an output signal of the displacement pickup with consideration of a phase of the rectangular signal, a sweeping/holding circuit for sweeping the rectified output signal in established sweeping time intervals; and a pulse supplying circuit which at predetermined time points produces on flanks of the regtangular signal control pulses to the phase-coupled rectifier and the sweeping/holding circuit for establishing the sweeping time intervals, wherein the predetermined time points are selected so that during the sweeping time intervals established by the time points the output signal after introducing of rectangular pulse in the displacement pickup is substantially naturally oscillated.

2. An evaluating circuit as defined in claim 1, wherein said pulse supplying circuit is a divider circuit.

3. An evaluating circuit as defined in claim 1, wherein the phase-coupled rectifier is formed so that it, in addition to two switching conditions for switching over of a voltage direction, also has an open switching condition and, when switched by the control pulse from said pulse supplying circuit, it interrupts the output signal by transition of the open switching condition, whereby it simultaneously performs a sweeping function of the sweeping/holding circuit.

* * * * *